UNITED STATES PATENT OFFICE.

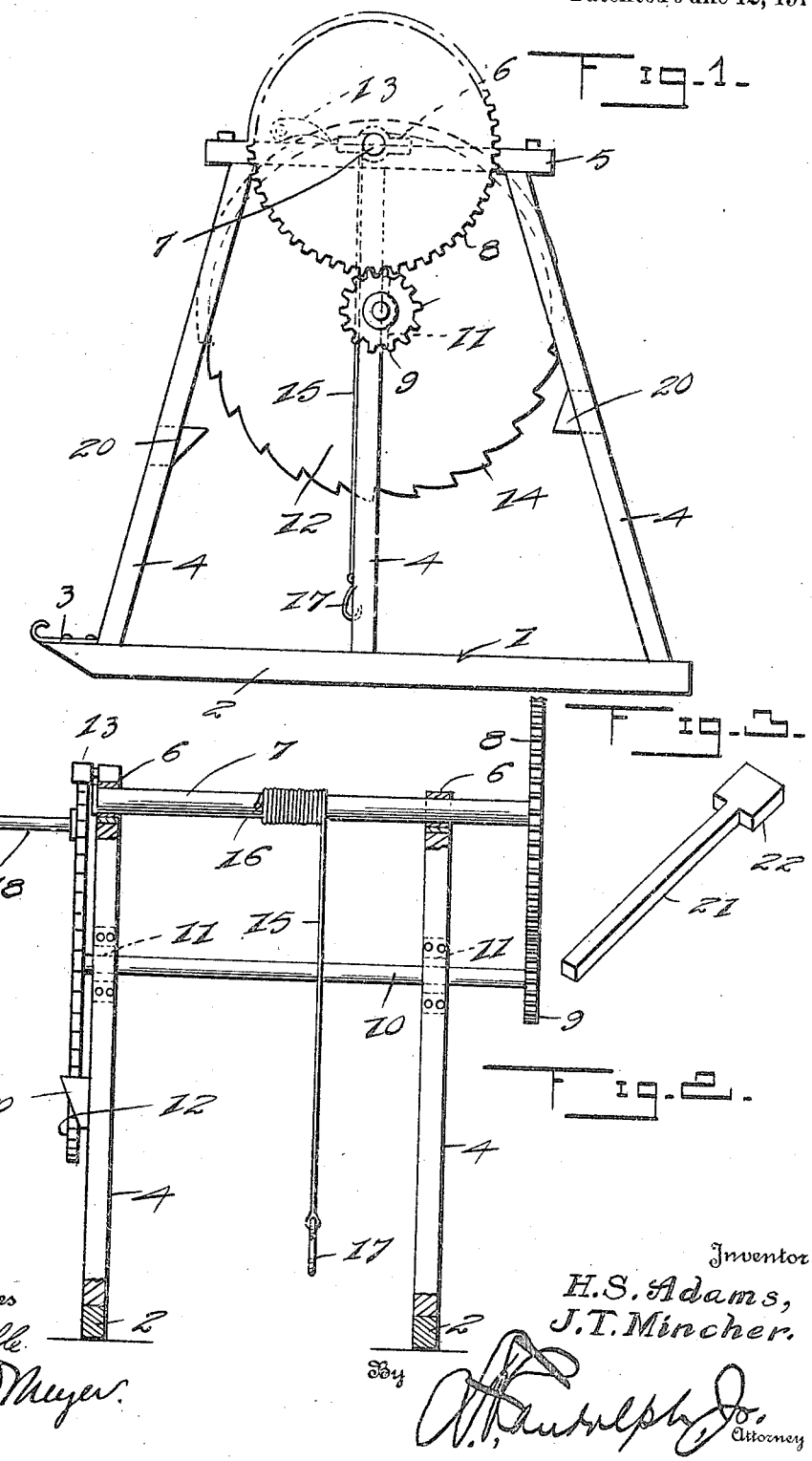

HENRY S. ADAMS AND JOHN T. MINCHER, OF VIBURNUM, MISSOURI.

STUMP-PULLER.

1,229,853.                    Specification of Letters Patent.      Patented June 12, 1917.

Application filed March 1, 1916. Serial No. 81,511.

*To all whom it may concern:*

Be it known that we, HENRY S. ADAMS and JOHN T. MINCHER, citizens of the United States, residing at Viburnum, in the county of Iron and State of Missouri, have invented certain new and useful Improvements in Stump-Pullers; and we do hereby declare the following to be a full, clear, and exact description of the invention, such as will enable others skilled in the art to which it appertains to make and use the same.

The invention relates to stump pullers, and the primary object of the invention is to provide a stump puller, which is comparatively simple in construction, and includes a portable frame, upon which a shaft is rotatably mounted, for the winding of a cable thereon, for pulling stumps, and further to provide a set of gearings for rotating the cable carrying shaft and also means for preventing the accidental unwinding rotation of the shaft.

With the foregoing and other objects in view this invention consists in such novel features of construction, combination and arrangement of parts as will be hereinafter more fully described, illustrated in the accompanying drawings and claim.

In describing the invention in detail reference will be had to the accompanying drawings wherein like characters designate like and corresponding parts throughout the several views, and in which:—

Figure 1 is a side elevation of the improved stump puller showing parts thereof broken away, Fig. 2 is an edge view of the improved stump puller showing parts broken away, and Fig. 3 is a detail view of a lever used in connection with the stump puller.

Referring more particularly to the drawings, 1 designates the portable supporting structure of the stump puller as an entirety, which includes a pair of runners 2, to the upper surface of the forward ends of which hooks 3 are attached, for the purpose of hitching a draft animal to the supporting structure if desired.

The runners 2 have a plurality of standards 4 connected thereto, the upper ends of which are connected by the cross bars 5. The cross bars 5 have bearings 6 carried thereby intermediate their ends which rotatably support a shaft 7. The shaft 7 carries a gear 8 mounted thereupon, which gear meshes with a gear 9 carried by a shaft 10. The shaft 10 is rotatably supported by suitable bearings 11, which are in turn supported by the central upright or standard 4. The shaft 10 projects beyond the side of the portable structure 1, oppositely from the gear 9, and has a ratchet wheel 12 mounted thereon, which is greater in diameter than either of the gears 8 or 9. A pawl 13, is pivotally carried by one of the cross bars 5 for co-action with the ratchet teeth 14 which are formed upon the periphery of the ratchet wheel 12, for preventing the accidental unwinding rotation of the shafts 10 and 7. The shaft 7 has one end of a cable 15 connected thereto as is shown at 16, which cable is adapted for winding about the shaft 7, for the purpose of pulling a stump. A hook or an analogous grappling device 17 is carried by the free end of the cable 15. The gear 8, is of greater diameter than the gear 9, so that the speed of rotation imparted to the shaft 10, will be decreased when imparted to the shaft 7, and the power thereof consequently increased. The ratchet wheel 12 has a handle 18 connected thereto for facilitating the manual rotation of the wheel.

The standards 4 have blocks 20 attached thereto, which blocks are adapted for forming fulcrums for the lever 21, which is illustrated in Fig. 3 of the drawings, which lever is employed for pulling stumps which are relatively hard to pull. In employing the lever 21, it is placed over either of the blocks 20, and the enlarged end 22 of the same is positioned in engagement with the square shoulders of any one of the ratchet teeth 14 of the ratchet 12, and the lever is pivotally moved for rotating the ratchet and consequently the shaft 7 for winding the cable 15 thereon.

In reducing the invention to practice, certain minor features of construction, combination and arrangement of parts may necessitate alteration to which the patentee is entitled provided such alterations are comprehended within the scope of what is claimed.

What is claimed is:—

In a stump puller, a supporting structure including a pair of runners, a plurality of upstanding braces carried by said runners, a cable carrying drum rotatably carried by said braces, a shaft rotatably carried by certain of said braces, a ratchet mounted upon said shaft, a pair of outwardly extending fulcrum blocks carried by certain of said braces below the center of said ratchet, said fulcrum blocks being disposed upon opposite sides of the center of the ratchet, and a lever adapted to be placed upon either of said fulcrum blocks and in engagement with one tooth of said ratchet for rotating the ratchet upon pivotal movement of the lever.

In testimony whereof we affix our signatures in presence of two witnesses.

HENRY S. ADAMS.
JOHN T. MINCHER.

Witnesses:
G. P. BATES,
R. A. COUNTS.

Copies of this patent may be obtained for five cents each, by addressing the "Commissioner of Patents, Washington, D. C."